United States Patent
O'Banion

(10) Patent No.: US 7,165,710 B2
(45) Date of Patent: *Jan. 23, 2007

(54) METHOD AND APPARATUS FOR FASTENING STEEL FRAMING WITH A SPIN WELD PIN

(75) Inventor: Michael L O'Banion, Westminster, MD (US)

(73) Assignee: Black & Decker Inc., Newark, DE (US)

( * ) Notice: Subject to any disclaimer, the term of this patent is extended or adjusted under 35 U.S.C. 154(b) by 413 days.

This patent is subject to a terminal disclaimer.

(21) Appl. No.: 10/177,523

(22) Filed: Jun. 21, 2002

(65) Prior Publication Data

US 2003/0012619 A1    Jan. 16, 2003

Related U.S. Application Data

(60) Provisional application No. 60/299,900, filed on Jun. 21, 2001.

(51) Int. Cl.
  B23K 20/12 (2006.01)
  B23K 37/00 (2006.01)
  B23K 31/02 (2006.01)

(52) U.S. Cl. .................. 228/2.1; 228/112.1

(58) Field of Classification Search ............ 228/112.1, 228/2.1, 2.3, 114.5; 411/82.5, 376, 501, 411/503
See application file for complete search history.

(56) References Cited

U.S. PATENT DOCUMENTS

| 3,477,115 | A | * | 11/1969 | Martin et al. ............ 228/114.5 |
| 4,247,219 | A | * | 1/1981 | Ausprung ................. 403/326 |
| 4,551,189 | A | * | 11/1985 | Peterson .................. 156/73.5 |
| 4,699,552 | A | * | 10/1987 | Jeal ........................ 411/43 |
| 4,850,772 | A | * | 7/1989 | Jenkins ................... 411/171 |
| 5,316,423 | A | * | 5/1994 | Kin ......................... 411/510 |
| 5,356,253 | A | * | 10/1994 | Whitesell ................. 411/188 |
| 5,460,317 | A | * | 10/1995 | Thomas et al. .......... 228/112.1 |
| 5,794,835 | A | * | 8/1998 | Colligan et al. ......... 228/2.1 |
| 5,829,664 | A | * | 11/1998 | Spinella et al. .......... 228/112.1 |

(Continued)

FOREIGN PATENT DOCUMENTS

DE        2345233 A        3/1975

(Continued)

OTHER PUBLICATIONS

Sprovieri, John, "Spin to Win," Assembly Magazine, May 2002, pp. 42-45, www.assemblymag.com.

(Continued)

*Primary Examiner*—Lynne R. Edmondson
(74) *Attorney, Agent, or Firm*—Harness, Dickey & Pierce, P.L.C.

(57) ABSTRACT

A spin weld pin according the principles of the present invention can be rotated at a high speed relative to two or more framing members by a torque transmitting device. An axial force is applied to the pin as it rotates so that the pin contacts the framing members and generates frictional heat. The heat generated causes the framing members to enter a molten state and allows the pin to penetrate therethrough. Rotation of the pin is ceased and as the pin and framing members cool, a bond is formed that joins the framing members and pin together.

20 Claims, 2 Drawing Sheets

U.S. PATENT DOCUMENTS

| | | | |
|---|---|---|---|
| 5,975,406 A * | 11/1999 | Mahoney et al. | 228/112.1 |
| 6,045,028 A * | 4/2000 | Martin et al. | 228/112.1 |
| 6,067,839 A * | 5/2000 | Xie | 72/391.8 |
| 6,095,395 A * | 8/2000 | Fix, Jr. | 228/2.3 |
| 6,102,636 A * | 8/2000 | Geise | 409/231 |
| 6,168,066 B1 * | 1/2001 | Arbegast | 228/102 |
| 6,206,268 B1 * | 3/2001 | Mahoney | 228/112.1 |
| 6,227,433 B1 * | 5/2001 | Waldron et al. | 228/112.1 |
| 6,284,001 B1 * | 9/2001 | Knapp | 623/21.14 |
| 6,398,883 B1 * | 6/2002 | Forrest et al. | 148/516 |
| 6,640,414 B1 * | 11/2003 | Wang et al. | 29/525.14 |
| 6,848,233 B1 * | 2/2005 | Haszler et al. | 52/783.17 |
| 2002/0014516 A1 * | 2/2002 | Nelson et al. | 228/112.1 |
| 2002/0027155 A1 * | 3/2002 | Okamura et al. | 228/112.1 |
| 2002/0027156 A1 * | 3/2002 | Coletta et al. | 228/112.1 |
| 2002/0125297 A1 * | 9/2002 | Stol et al. | 228/112.1 |
| 2002/0168246 A1 * | 11/2002 | Voznesensky | 411/530 |
| 2003/0010805 A1 * | 1/2003 | Nelson et al. | 228/2.1 |
| 2003/0012620 A1 * | 1/2003 | O'Banion et al. | 411/386 |
| 2003/0116609 A1 * | 6/2003 | Dracup et al. | 228/112.1 |
| 2003/0118419 A1 * | 6/2003 | Easterbrook et al. | 411/1 |
| 2005/0178816 A1 * | 8/2005 | Stevenson et al. | 228/112.1 |

FOREIGN PATENT DOCUMENTS

| | | | |
|---|---|---|---|
| DE | 196 20 814 A | | 11/1997 |
| DE | 10125117 A1 | * | 5/2002 |
| DE | 10125117 A1 | * | 5/2002 |
| EP | 0 627 276 A | | 12/1994 |
| GB | 2306366 A | * | 5/1997 |
| GB | 2306366 A | * | 5/1997 |
| GB | 2 349 591 A | | 11/2000 |
| JP | 02248236 A | * | 10/1990 |
| JP | 2000-9122 A | * | 1/2000 |
| JP | 2000141065 A | * | 5/2000 |
| JP | 2000141066 A | * | 5/2000 |
| WO | 202504 A | | 1/2002 |

OTHER PUBLICATIONS

International Search Report for PCT/US02/19626 mailed Sep. 18, 2002.

* cited by examiner

METHOD AND APPARATUS FOR FASTENING STEEL FRAMING WITH A SPIN WELD PIN

CROSS-REFERENCE TO RELATED APPLICATIONS

This application claims the benefit of U.S. Provisional Application No. 60/299,900, filed Jun. 21, 2001.

FIELD OF THE INVENTION

The present invention relates generally to steel framing and, more particularly, to an improved cost-effective method for fastening steel frame members.

BACKGROUND OF THE INVENTION

Steel framing is revolutionizing the construction industry. Steel is a high quality framing material that will not shrink, warp, or attract termites and other wood boring insects. In recent years, the price of steel has become more competitive with wood and other construction materials. However, despite its advantages, steel framing has not become prevalent in the residential construction industry. The lack of a quick and cost effective technique for fastening steel members has prevented steel framing from emerging as the predominant building material in residential construction.

Therefore, it is desirable to provide a quick and cost-effective technique for fastening steel members. It is envisioned that the steel fastening technique will be comparable in speed to an air nailer used to fasten wood materials. It is further envisioned that the steel fastening technique will provide a minimal gap between steel members, a pullout force of at least 216 lb., a shear force of at least 164 lb., as well as cause minimal destruction of any galvanize coating on the steel members.

SUMMARY OF THE INVENTION

A spin weld pin according to the principles of the present invention provides the ability to quickly and cost effectively fasten steel framing members together. The pin is rotated at a high speed relative to two or more steel framing members, penetrates therethrough, and bonds with the steel framing members to fasten them together.

The fastener for joining framing members together by spin welding according to the principles of the present invention comprises a pin having an axial axis, axially opposite first and second ends and a stem that extends axially therebetween. The first end has a head which is adapted to be driven by a torque transmitting device. The second end has a tip that is adapted to penetrate the framing members. The pin is adapted to be rotated relative to the framing members and to receive an axial force while rotating. Application of the axial force in conjunction with the rotation of the pin causes the tip to melt a portion of the framing members and penetrate through the melted portion. When the rotation of the pin is ceased, the pin bonds with the framing members which joins the two framing members together by the pin.

A method of joining two or more framing members together according to the principles of the present invention is also disclosed. The method includes the steps of (a) rotating a spin weld pin about an axial axis relative to two or more adjacent framing members; (b) applying an axial force to the pin as the pin is rotating so that the rotating pin contacts and pushed on the framing members; (c) penetrating through the framing members with the rotating pin; and (d) bonding the pin to the framing members by ceasing rotation of the pin with the bonding joining the framing members together.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
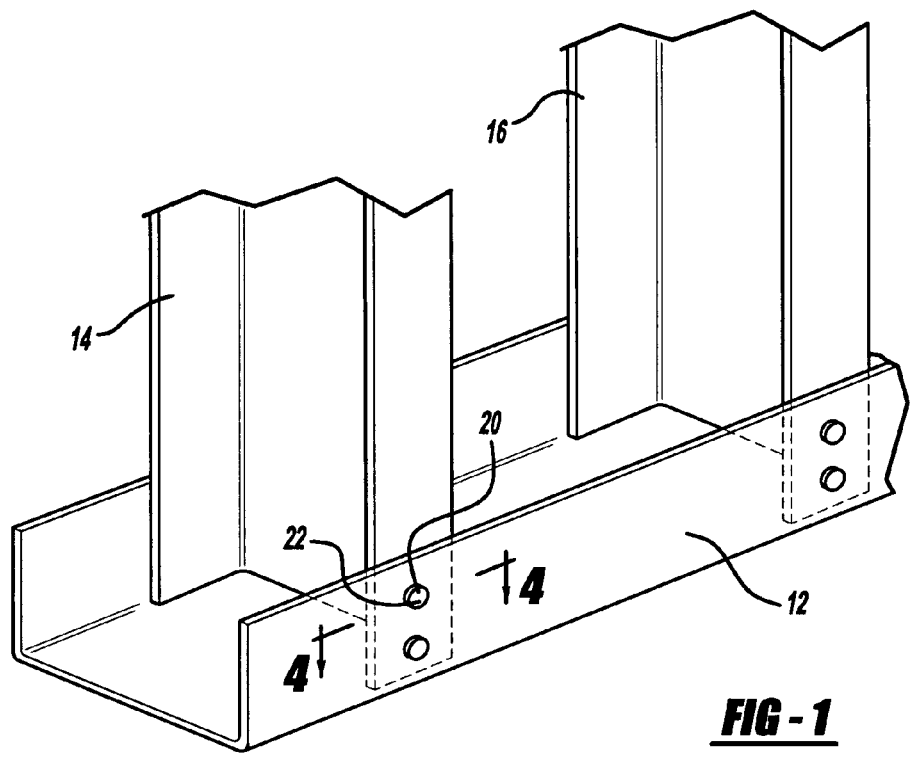
FIG. 1 is a fragmentary prospective view of a steel framing member having two additional steel framing members fastened thereto in accordance with the present invention.

Referring to FIG. 1, a fragmentary perspective view of a longitudinal steel framing member 12 having two upright steel framing members 14 and 16 fastened thereto. Each c-shaped framing member includes a bottom wall and two side walls having a thickness in the range from 0.018" to 0.071". Additionally, each steel member may range from 33 ksi to 80 ksi as is well known in the art. As will be more fully described below, one or more fasteners 20 may be used to join the upright steel framing members 14 and 16 to the longitudinal steel framing member 12. While the following description is provided with reference to this particular configuration, it is readily understood that the fastening technique of the present invention is applicable to any two or more adjacent members made of steel (e.g., carbon steel, hardened steel, stainless steel, tool steel, etc.) or other material having similar attributes to those of steel (e.g., nonferrous metals, including nickel, alloys, titanium, copper and aluminum). Additionally, the members to be joined may be dissimilar metals and still be fastened together by the pin and method of the present invention.

Figure 3:
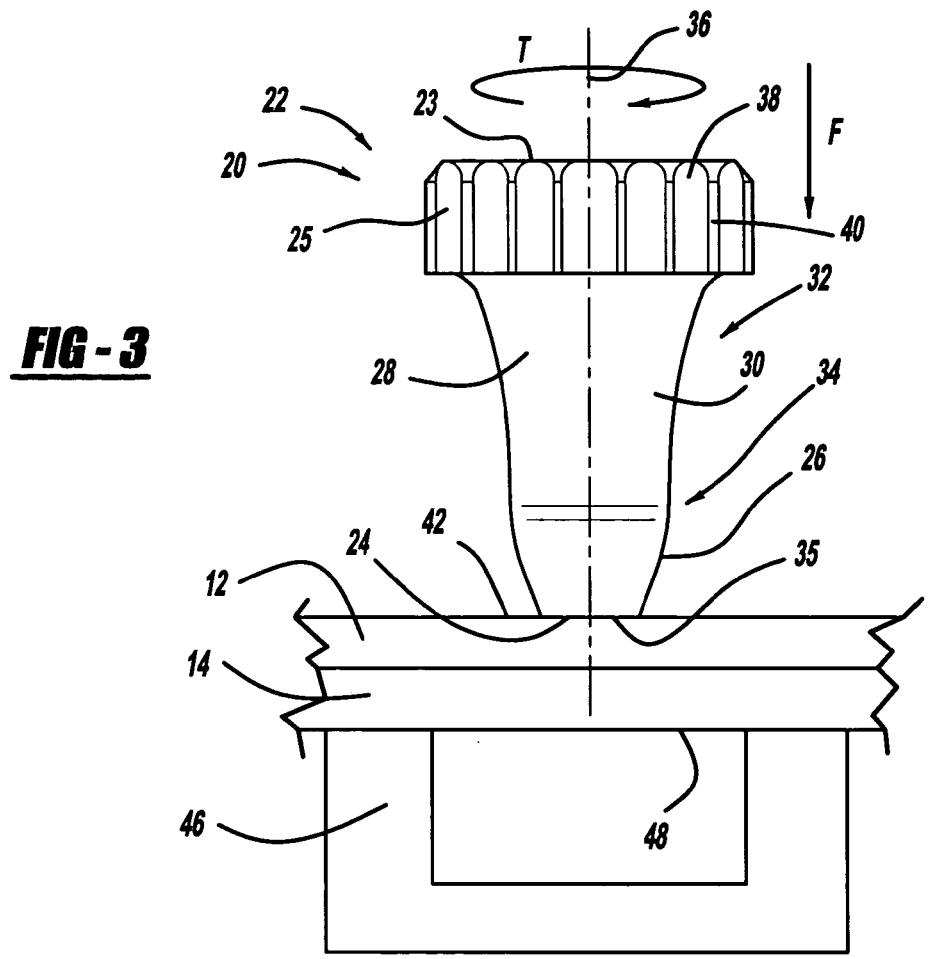
FIG. 3 is a side view of the first preferred embodiment of the spin weld pin positioned adjacent to two steel members.
Figure 4:
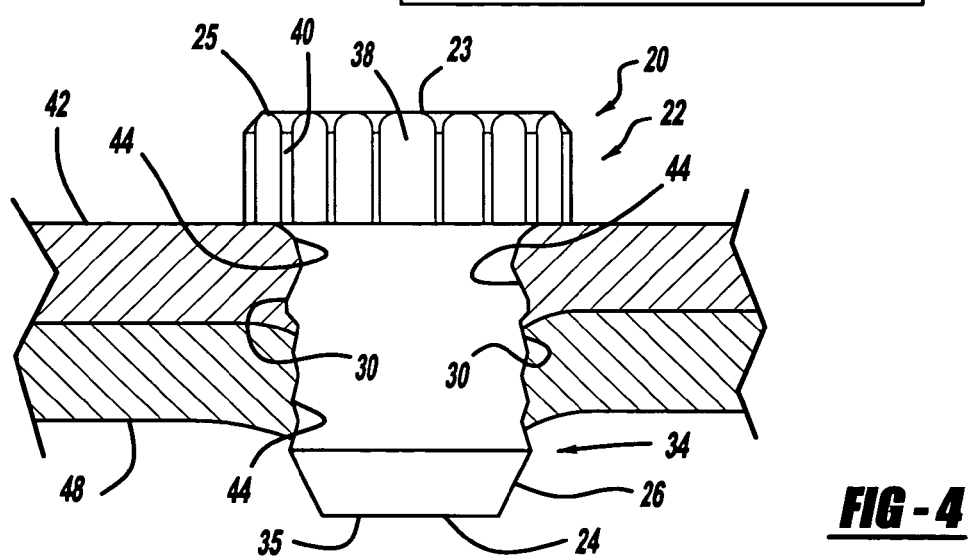
FIG. 4 is a cross-sectional view, taken along the line 4—4 of FIG. 1, illustrating a second preferred embodiment of the spin weld pin penetrating the two steel members in accordance with the present invention.

In accordance with the present invention, one or more spin weld pins 22 are used to fasten the steel framing members together. Referring to FIG. 3, pin 22 has opposite first and second ends 23 and 24. First end 23 has a head 25 and second end 24 has a tip 26. A stem 28 extends between head 25 and tip 26. Stem 28 has an outer surface 30 that can take a variety of forms. For example, in a first preferred embodiment as shown in FIG. 3, outer surface 30 has a tapered portion 32 that narrows a diameter of pin 22 as stem 28 extends from head 25 toward tip 26. An intermediate portion 34 separates first tapered portion 32 from tip 26. As shown, the tapering of stem 28 stops proximate to intermediate portion 34 as stem 28 transitions to tip 26. Alternatively, in a second preferred embodiment as shown in FIG. 4, outer surface 30 of stem 28 is in the form of various irregular shapes. The use of irregular shapes, as will be discussed in more detail below, facilitates the penetration process and/or strength of the weld between the pin and steel framing members.

Tip 26 tapers as it extends from intermediate portion 34 toward second end 24. Tip 26 has a substantially flat portion 35 that coincides with second end 24. Flat portion 35, as will be explained in more detail below, helps facilitate heating the steel framing members. Tapering of tip 26, as will be explained in more detail below, helps facilitate the penetration of pin 22 through the steel framing members.

Head 25 is adapted to be driven by a torque transmitting device (e.g., a drill) (not shown) either directly or through a fitting coupled to the torque transmitting device. The torque transmitting device applies a torque T to head 25 which causes pin 22 to rotate about axial axis 36. The torque transmitting device also applies an axial force F on pin 22 as pin 22 rotates. Axial force F pushes pin 22 toward the steel framing members to facilitate the joining process, as will be described in more detail below. One skilled in the art will readily recognize that various well known torque transmitting devices could be used to rotate and apply an axial force to pin 22. Pin 22 is rotated at very high rotational speeds (e.g., 40,000+ rpm), as will be discussed in more detail below, and, as such, head 25 is configured to be connected to a torque transmitting device which operates at the very high speeds.

Figure 2:
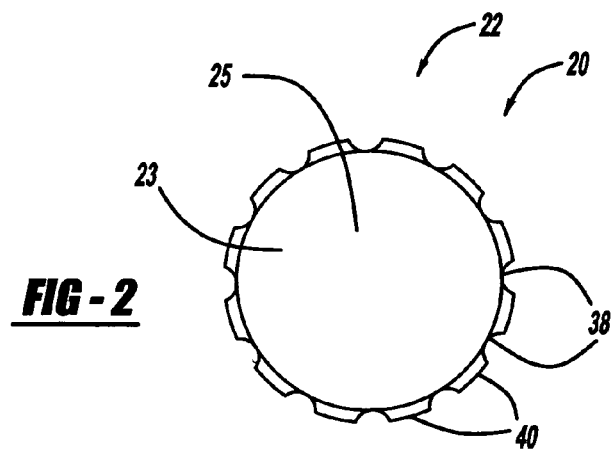
FIG. 2 is a top view of a first preferred embodiment of a spin weld pin in accordance with the present invention.

To facilitate the connection between a torque transmitting device and pin 22, head 25 has a plurality of recesses 38, as can be seen in FIGS. 2–4. Recesses 38 are spaced evenly about a periphery of head 25 and separated by ribs 40. Recesses 38 are semicircular in shape and extend from a top of head 25 to a bottom of head 25. The plurality of recesses 38 and ribs 40 enable a complementary torque transmitting device or fitting to have a plurality of points of contact with pin 22 so that torque T can be effectively applied to pin 22 while limiting a possibility of slippage between the torque transmitting device and pin 22. The specific configuration of head 25 can be adapted to receive various types of torque transmitting devices or fittings that connect the torque transmitting device to pin 22. Therefore, while head 25 is shown as having recesses 38 and ribs 40 spaced about the periphery of head 25, it should be understood that other configurations and variations can be utilized without departing from the scope of the present invention. For example, one or more slots or recesses can be positioned on a top surface of head 25, such as those that can accommodate a Phillips or hex bit. Alternatively, and/or additionally, head 25 can be in the form of a bolt head on which a complementary socket fitting can be secured and driven by a torque transmitting device. Preferably, head 25 has an axial length in the range of about 0.03" to 0.06" so that pin 22 does not protrude more than about 0.06" from steel framing members it fastens together.

The torque transmitting device can be any of a variety of well-known torque transmitting devices that are capable of very high rotational speeds (e.g., 40,000+ rpm). Additionally, the torque transmitting device must be capable of imparting an appropriate axial force F on pin 22 as it is being rotated at the very high rotational speeds. For example, a high speed drill can be used as the torque transmitting device.

Pin 22 can be made from a variety of materials. The material from which pin 22 is made needs to be capable of withstanding the heat generated during the fastening process and of bonding with steel framing members. Preferably, pin 22 is made from steel. However, it should be understood that pin 22 does not need to be constructed of the same material as steel framing members 12 and 14 in order to function as a fastener according to the principles of the present invention. Rather, the spin welding technique and pin of the present invention enables the bonding together of dissimilar metals. Accordingly, pin 22 may be constructed of a metallic material which exhibits frictional characteristics more favorable to spin welding.

Operation of pin 22 to fasten two or more steel framing members together will now be described. As can be seen in FIG. 3, steel framing members 12 and 14 are positioned adjacent one another and pin 22 is positioned adjacent an outer surface 42 of steel framing member 12. Pin 22 is rotated about axial axis 36 at very high rotational speeds relative to steel framing members 12 and 14. Preferably, pin 22 is spun at a speed in the range of about 40,000 rpm to 60,000 rpm. As pin 22 is rotating, axial force F is applied to cause flat surface 35 of tip 26 to contact outer surface 42. Optionally, pin 22 can be placed in contact with outer surface 42 prior to beginning rotation about axial axis 36. The surface contact between pin 22 and outer surface 42 creates friction which generates a great amount of heat. Friction between pin 22 and outer surface 42 removes surface oxides, melts the galvanized coating and heats a portion of steel framing members 12 and 14 proximate pin 22. As heat continues to be generated, the portion of steel framing members 12 and 14 proximate pin 22 enter a plastic state and then a molten state. Axial force F on pin 22 causes pin 22 to penetrate through the molten portions of steel framing members 12 and 14. The frictional heat generated also causes an outer portion of pin 22 to enter a plastic state and possibly a molten state. Once pin 22 passes through steel framing members 12 and 14, rotational torque T is no longer applied to pin 22. The axial force F can be removed concurrently with the cessation of torque T or, can continue to be applied to pin 22 for a period of time after rotational torque T is no longer being applied to pin 22. The cessation of rotation of pin 22 stops the generation of heat and allows steel framing members 12 and 14 and pin 22 to begin to cool. The molten state of steel framing members 12 and 14 and the plastic or molten state of pin 22 causes outer surface 30 of pin 22 and inner surfaces 44 of steel framing members 12 and 14 to come into intimate contact and creates an intermolecular bond or weld as cooling occurs. The weld or bond formed between outer surface 30 and inner surfaces 44 provides the pullout force and shear force requirements discussed above.

Optionally, as shown in FIG. 3, a back plate 46, which can be integral to the torque transmitting device, an attachment thereto or a separate component, can be positioned adjacent an outer surface 48 of steel framing member 14 opposite outer surface 42 of steel framing member 12 to resist deflection of steel framing members 12 and 14 in response to axial force F being applied to pin 22. Backing plate 46 helps maintain contact between steel framing members 12 and 14 while pin 22 melts and penetrates them. Backing plate 46 may also be used to help maintain contact between steel framing members 12 and 14 while cooling and bonding occurs.

The speed of rotation of pin 22 will vary depending upon the surface area of tip 26 which contacts outer surface 42 of steel framing member 12. Specifically, as the surface area decreases, the speed at which pin 22 needs to be rotated increases to generate a same amount of frictional heat. Additionally, the time within which a molten state is achieved in steel framing members 12 and 14 proximate pin 22 will vary depending upon the rate at which frictional heat is generated. To increase the surface area of tip 26 that contacts outer surface 42, tip 26 is provided with flat surface 35. However, it should be understood that tip 26 is not required to have flat surface 35 to generate sufficient heat to melt the steel framing members and penetrate therethrough nor to be within the scope of the present invention. For example, tip 26 can have a rounded or irregular surface and still be within the scope of the present invention. Tip 26 could also be concave to provide a favorable concentration of axial force F on a periphery of second end 24 which increases the force per unit area pin 22 exerts on outer surface 42 which in turn may speed initiation of the melting of framing member 12. The amount of axial force F necessary to penetrate steel framing members 12 and 14 is low due to the molten state of steel framing members 12 and 14 proximate pin 22.

The shape of outer surface 30 and tip 26 can effect the ability of pin 22 to penetrate through and bond with steel framing members 12 and 14. For example, the tapering of tip 26 facilitates penetration by pushing the molten portions of steel framing members 12 and 14 radially outwardly as pin 22 is moved axially. The tapering of outer surface 30 of stem 28 also continues to facilitate radially outwardly pushing molten inner surfaces 44 of steel framing members 12 and 14 radially outwardly so that pin 22 can penetrate therethrough with minimal axial force F. When outer surface 30 of stem 28 is irregular in shape, the irregularity allows the molten inner surfaces 44 of steel framing members 12 and 14 to bond or interlock with pin 22 at various locations and orientations and provides redundant obstructions in the event one or more bond points between outer surface 30 and inner surfaces 44 fails. Thus, a stronger joint between steel framing members 12 and 14 and pin 22 can be formed by the use of an irregular outer surface 30. Additionally, surface textures, such as knurls or ribs, can be used to speed melting of outer surface 30. The knurls or ribs will be in contact with inner surfaces 44 of steel framing members 12 and 14 and provide the frictional heat generation. Because the knurls or ribs represent only a portion of outer surface 30, the heat is concentrated on a smaller surface area and the knurls or ribs will begin melting sooner.

While the present invention is shown as fastening two steel framing members 12 and 14 together, it should be understood that the present invention can be used to fasten more than two steel framing members together. For example, four steel framing members can be positioned adjacent one another and pin 22 used to join the four steel framing members together. Additionally, it should be understood that while specific configurations of outer surface 30 of stem 28 and of tip 26 are shown, other configurations can be utilized and still be within the scope of the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A spin welding fastener for joining framing members together comprising:
    a metal pin having an axial axis, axially opposite first and second ends and a stem extending axially therebetween, a portion of said stem tapering as said stem extends between said first and second ends, said tapering changing an outer diameter of said portion of said stem, said first end adapted to be driven by a torque transmitting device, said second end being a tip having a flat portion substantially perpendicular to said axial axis, an outer portion of said tip tapering toward said flat portion, said tip and said stem adapted to penetrate the framing members, and said pin being adapted to be rotated relative to the framing members and to receive an axial force while rotating, application of said axial force and rotation of said pin causing said tip to melt a portion of the framing members, said tip and said stem to penetrate through said melted portion of the framing members, and said stem to bond with the framing members upon cessation of said rotation so that the framing members are joined together by said pin,
    wherein said stem has a radial diameter that increases as said stem extends from said second end toward said first end.

2. The fastener of claim 1, wherein said stem has an outer surface that is irregular.

3. A spin welding fastener for joining framing members together comprising:
    a metal pin having an axial axis, axially opposite first and second ends and a stem extending axially therebetween, a portion of said stem tapering as said stem extends between said first and second ends, said tapering changing an outer diameter of said portion of said stem, said first end adapted to be driven by a torque transmitting device, said second end being a tip having a flat portion substantially perpendicular to said axial axis, an outer portion of said tip tapering toward said flat portion, said tip and said stem adapted to penetrate the framing members, and said pin being adapted to be rotated relative to the framing members and to receive an axial force while rotating, application of said axial force and rotation of said pin causing said tip to melt a portion of the framing members, said tip and said stem to penetrate through said melted portion of the framing members, and said stem to bond with the framing members upon cessation of said rotation so that the framing members are joined together by said pin,
    wherein said tapered portion of said stem tapers at a first rate, said outer portion of said tip tapers at a second rate, and said second rate is different than said first rate.

4. The fastener of claim 1, wherein said first end has at least one recess on a periphery thereof configured to allow said first end to be rotated by a complementary torque transmitting device.

5. The fastener of claim 1, wherein said first end is a head adapted to be driven by a torque transmitting device.

6. A method of joining two or more framing members together comprising the steps of:
    (a) rotating a spin weld pin about an axial axis relative to two or more adjacent framing members, said pin having axially opposite first and second ends with a radially expanding stem therebetween;
    (b) applying an axial force to said pin as said pin is rotating so that a flat portion on a tip of said rotating pin contacts and pushes on said framing members;

(c) penetrating through said framing members with said tip and said radially expanding stem of said rotating pin; and (d) bonding said radially expanding stem of said pin to said framing members by ceasing rotation of said pin, said bonding joining said framing members together.

7. The method of claim 6, wherein step (a) includes rotating said pin above 40,000 rpm.

8. The method of claim 6, wherein step (a) includes rotating said pin with a powered torque transmitting device.

9. The method of claim 6, wherein step (c) includes melting a portion of said framing members with said rotating pin and penetrating said framing members through said melted portion.

10. The method of claim 6, wherein step (d) includes forming an intermolecular bond.

11. The method of claim 6, further including the steps of:
(e) positioning a back plate adjacent an opposite side of said framing members than said pin; and
(f) supporting said opposite side of said framing members with said back plate while said pin is penetrating said framing members.

12. The method of claim 6, wherein said framing members are steel framing members.

13. The method of claim 6, wherein a portion of said pin that bonds to said framing members has an irregular shape.

14. A method of constructing a steel frame comprising the steps of:
(a) positioning at least two steel framing members each having a thickness in a range of about 0.018 inches to 0.071 inches adjacent one another;
(b) positioning a spin weld pin adjacent said framing members, said pin having axially opposite first and second ends with a tapering stem therebetween, said second end forming a tip;
(c) rotating said pin about an axial axis relative to said framing members;
(d) applying an axial force to said rotating pin so that said second end of said rotating pin contacts and pushes against said framing members;
(e) penetrating through said framing members with said second end and said stem of said rotating pin; and
(f) bonding said stem of said pin to said framing members by ceasing rotation of said pin, said bonding joining said framing members together.

15. The method of claim 14, wherein (c) includes rotating said pin above 40,000 rpm.

16. The method of claim 14, wherein (c) includes rotating said pin with a powered torque transmitting device.

17. The method of claim 14, wherein (e) includes melting a portion of said framing members with said rotating pin and penetrating said framing members through said melted portion.

18. The method of claim 14, wherein (f) includes forming an intermolecular bond.

19. The method of claim 14, further including the steps of:
(g) positioning a back plate adjacent an opposite side of said framing members than said pin; and
(h) supporting said opposite side of said framing members with said back plate while said pin is penetrating said framing members.

20. The fastener of claim 1, wherein an exterior surface of said stem and said tip forms a smooth and continuous surface free of any step changes in diameter as said outer surface extends axially between said first and second ends.

* * * * *